United States Patent [19]

Schlauer et al.

[11] 4,405,593
[45] Sep. 20, 1983

[54] PROCESS OF DECREASING THE SULFUR CONTENT OF EXHAUST GASES OBTAINED DURING THE RECOVERY OF SULFUR

[75] Inventors: Johann Schlauer, Frankfurt am Main; Herbert Fischer, Lollar; Manfred Kriebel, Frankfurt am Main, all of Fed. Rep. of Germany

[73] Assignee: Metallgesellschaft Aktiengesellschaft, Frankfurt am Main, Fed. Rep. of Germany

[21] Appl. No.: 302,885

[22] Filed: Sep. 16, 1981

[30] Foreign Application Priority Data

Sep. 25, 1980 [DE] Fed. Rep. of Germany ....... 3036132

[51] Int. Cl.³ .............................................. C01B 17/04
[52] U.S. Cl. ................................. 423/574 R; 423/576; 423/222
[58] Field of Search ................. 423/573, 574, 576, 222

[56] References Cited

U.S. PATENT DOCUMENTS

| | | | |
|---|---|---|---|
| 3,317,281 | 5/1967 | Grekel | 423/576 |
| 3,939,250 | 2/1976 | Michel et al. | 423/576 |
| 4,097,585 | 6/1978 | Fischer | 423/574 |
| 4,100,266 | 7/1978 | Smith | 423/574 |
| 4,341,753 | 7/1982 | Mori et al. | 423/574 R |

FOREIGN PATENT DOCUMENTS 905365 9/1962 United Kingdom .
1151398 5/1969 United Kingdom .

Primary Examiner—Earl C. Thomas
Attorney, Agent, or Firm—Sprung, Horn, Kramer & Woods

[57] ABSTRACT

In a process of decreasing the sulfur content of exhaust gases obtained during the recovery of sulfur from acid gases containing $H_2S$ and other S-containing compounds in the Claus process, the acid gases which contain $H_2S$ and other S-containing compounds are reacted in a Claus plant to form elemental sulfur. A gas which contains $H_2S$ or $SO_2$ is subsequently added at a controlled rate to maintain a stoichiometric ratio of 2:1 of $H_2S$ to $SO_2$ in the tail gas from the Claus plant. The gas which contains $H_2S$ or $SO_2$ may be added to the tail gas from the Claus plant or before the last contacting stage of a multistage Claus plant. During the addition of a gas which contains $H_2S$, the Claus plant can be operated at an $H_2S$ to $SO_2$ ratio of or below 2:1. During the addition of a gas which contains $SO_2$ the Claus plant can be operated at an $H_2S$ to $SO_2$ ratio of or above 2:1. The $H_2S$ and $SO_2$ contained in the tail gas are chemically reacted to form elementary sulfur in a tail gas-desulfurizing plant and the sulfur is withdrawn.

3 Claims, 2 Drawing Figures

PROCESS OF DECREASING THE SULFUR CONTENT OF EXHAUST GASES OBTAINED DURING THE RECOVERY OF SULFUR

BACKGROUND OF THE INVENTION

1. Field of the Invention

This invention relates to a process of decreasing the sulfur content of exhaust gases obtained during the recovery of sulfur from acid gases containing $H_2S$ and other S-containing compounds in the Claus process, wherein the S-compounds contained in the tail gas are chemically reacted to form elementary sulfur and the sulfur is withdrawn.

2. Discussion of Prior Art

In a known process for decreasing the sulfur content of exhaust gas obtained during the recovery of sulfur in the Claus process, the tail gas is burned, the burnt residual gases are passed at elevated temperature through a coke layer and are then cooled, the cooled gases are reversibly taken up by liquid absorbents and $SO_2$ is expelled and recycled to the Claus process (German Pat. No. 22 53 806).

On another known process of purifying the tail gases from the Claus process with recovery of sulfur, the tail gases are passed over active adsorbents at a lower temperature and the laden adsorbent is desorbed by a treatment with hot process gas. That process gas is circulated and the residual sulfur compounds are burned. The heat required to desorb the laden adsorbent is made available by a heat exchange between the desorbing gas and the exhaust gas that has been heated by the heat of reaction resulting from the reaction of the residual hydrogen sulfide with oxygen in the incinerator (German Pat. No. 25 55 096).

In another known process the tail gas from the Claus process is hydrogenated to form $H_2S$ and the latter is reacted with $SO_2$ to form sulfur. To that end, part of the hydrogen sulfide contained in the fresh acid gas is oxidized with a stoichiometric or slightly substoichiometric quantity of air to form sulfur dioxide and/or part of the resulting sulfur is reacted to form sulfur dioxide and the latter is reacted with the hydrogen sulfide formed by the hydrogenation. For this purpose, the still unreacted hydrogen sulfide is catalytically reacted with sulfur dioxide at temperature of 100° to 150° C. to form sulfur and the hot gases which contain hydrogen sulfide and are free from oxygen are passed through the laden catalyst to regenerate the latter (German Pat. No. 26 48 190).

The use of said known processes results in a higher yield of sulfur and in a purification of the tail gas from the Claus process to such a high degree that the exhaust gas can be delivered to the atmosphere.

On the other hand, the processes are complicated and consist of a plurality of steps. The energy consumption and capital requirement are considerable. Extraneous chemicals, such as coke, liquid absorbents, e.g., sodium phosphate solutions, or solid adsorbents, e.g., activated charcoal, are needed, which tend to be soiled and to lose their activity so that they must often be renewed. They can be regenerated only with difficulty. When it is desired to expel the absorbed $SO_2$, the liquid must be heated to the boil. Sulfur-laden activated charcoal must be regenerated with insert gases at elevated temperatures.

The main disadvantage of all known processes resides in that the $SO_2$ produced by a combustion or the high-$H_2S$ exhaust gas obtained by the hydrogenation, cannot be directly converted to S because the constituents $H_2S$ and $SO_2$ are not present in their stoichiometric ratio of 2:1. For this reason said gases are usually recycled to the Claus plant, in which a stoichiometric ratio of 2:1 of $H_2S$ to $SO_2$ is maintained by a suitable control of the rate at which combustion air is supplied to the acid gas burner. In a first approximation, the air rate is maintained in direct proportion to the rate of acid gas. The control is responsive to changes of the throughput rate of the acid gas but is not influenced by its composition. If the air rate is to be controlled also in dependence on the composition of the acid gas, all combustible constituents, not only the $H_2S$, must be taken into account so that the equipment required for measuring and controlling is considerably increased.

Because the hydrocarbons are not completely burned in the Claus process it is also necessary to monitor the ratio of $H_2S$ to $SO_2$ in the tail gas and to correct the rate at which air is supplied to the burner. In the prior art, the combustion air or part thereof is controlled in dependence on the ratio of $H_2S$ to $SO_2$ in the tail gas. This involves a great disadvantage, which resides in that there is a substantial delay between a change of the air supply to the burner and the effect of said change on the ratio of $H_2S$ to $SO_2$ in the tail gas. Owing to that delay, the feedback control system must have a slow response so that overshooting will be avoided.

As a result, the control system will respond only slowly to a change of the acid gas composition. For two reasons, it is not practicable to sample the tail gas at a point which is nearer to the combustion chamber so that the time between a change of the air rate and the detection of a change of the ratio of $H_2S$ to $SO_2$ could be shortened.

1. The concentration of $H_2S$ and $SO_2$ increase in that direction so that there is a smaller change of the ratio of $H_2S$ to $SO_2$.
2. Secondary reactions taking place on Claus catalysts, such as the hydrolysis of COS or the reduction of $SO_2$ by hydrogen, change the ratio of $H_2S$ to $SO_2$ in the Claus plant.

In the prior art it is not possible to obtain ratio of 2:1 of $H_2S$ to $SO_2$ in the tail gas. This fact results in losses of sulfur and in a larger emission. The deviation of the ratio of $H_2S$ to $SO_2$ from 2:1 will result in particularly high sulfur losses if the tail gas is desulfurized in that the Claus reaction

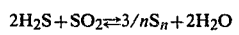

$$2H_2S + SO_2 \rightleftarrows 3/nS_n + 2H_2O$$

is continued and the elementary sulfur is withdrawn.

It is an object of the invention to eliminate these and other disadvantages of the prior art and to provide a new way of decreasing the emission of sulfur from the Claus process of recovering sulfur.

The new process should permit an adjustment of the stoichiometric ratio of 2:1 to $H_2S$ to $SO_2$ in the tail gas before the latter enters a desulfurizing plant. The process should be inexpensive and require no extraneous chemicals and involve only a low structural expenditure and low energy costs.

SUMMARY OF THE INVENTION

This object is accomplished in a process for decreasing the sulfur content of a tail gas released after the recovery of sulfur from an acid gas containing $H_2S$ by the Claus process, wherein the $H_2S$ contained in the tail gas is chemically reacted to form elemental sulfur and the sulfur is withdrawn, the improvement wherein the acid gas which contains $H_2S$ is reacted in a Claus plant to form elementary sulfur, a gas which contains $H_2S$ or $SO_2$ is added at a controlled rate to maintain a stoichiometric ratio of 2:1 of $H_2S$ to $SO_2$ in the tail gas from the Claus plant, and said $H_2S$ and $SO_2$ in said tail gas are catalytically reacted to form elementary sulfur and the sulfur is withdrawn.

The gas which contains $H_2S$ or $SO_2$ is preferably added to the tail gas from the Claus point.

According to a further preferred feature of the invention, the gas which contains $H_2S$ or $SO_2$ is added before the last contacting stage of a multistage Claus plant.

The gas which contains $H_2S$ can be advantageously obtained by diverting a branch stream from the acid gas which is to be fed to the Claus plant and to be processed therein.

The branch stream amounts suitably to less than 5% by volume of the total rate of the acid gas which is to be fed to the Claus plant and to be processed therein. Generally, the branch stream amounts to 0 to 3% by volume of the total rate of the acid gas.

If a gas which contains $H_2S$ is added, the Claus plant is operated in accordance with the invention at ratio of or below 2:1 of $H_2S$ to $SO_2$.

Within the scope of the invention the $SO_2$-containing gas is added to adjust the ratio of $H_2S$ to $SO_2$ to 2:1. The $SO_2$ gas can be obtained by burning a portion of acid feed gas to the Claus process.

Alternatively, an $SO_2$ containing gas to be added can be produced by burning all or a portion of the exhaust gas from the Claus plant.

Other sources may be used too, for instance, $SO_2$ expelled from liquid absorbents. The $SO_2$ may also be produced by a combustion of part of the sulfur which has been produced.

In a special embodiment of the invention, a gas which contains $SO_2$ is added and the Claus plant is operated at a ratio of or above 2:1 of $H_2S$ to $SO_2$.

Within the scope of the invention the two constituents maintained at a stoichiometric ratio of 2:1 are preferably reacted by the Claus reaction to form elementary sulfur.

Within the scope of the invention, the tail gases from two or more Claus plants can be conducted to a common tail gas-processing plant and can be jointly desulfurized therein.

The advantages afforded by the invention reside particularly in that a simple and economical process has been provided by which the emission of sulfur from a Claus plant can be decreased. The process requires no extraneous chemicals, absorbents or adsorbents. There is no need for expensive investments. By means of the process a stoichiometric ratio of 2:1 of $H_2S$ to $SO_2$ can be adjusted in the tail gas before it enters the desulfurizing plant so that an optimum conversion to elementary sulfur will be effected. The ratio of $H_2S$ to $SO_2$ is monitored by means of an analyzer after $H_2S$ or $SO_2$ has been added and is controlled by a controller to maintain a stoichiometric ratio of 2:1 of $H_2S$ to $SO_2$ at the inlet of the tail gas-desulfurizing plant. The advantage resides in that said ratio is controlled at that point without a delay. The rate at which air is supplied to the burner of the Claus plant can be controlled in accordance with the prior art.

Both feedback control systems can be adjusted quickly because any control action will initiate a response without an appreciable delay. A ratio of exactly 2:1 of $H_2S$ to $SO_2$ will result in a maximum conversion to elementary sulfur in the tail gas-desulfurizing plant. The sulfur can be withdrawn and the exhaust gas can be fed to an incinerator.

If the ratio of $H_2S$ to $SO_2$ has been adjusted in accordance with the invention, the exhaust gas from the tail gas-desulfurizing plant will contain less $H_2S$ and/or $SO_2$ than an exhaust gas from a plant operated in accordance with the prior art. As the exhaust gas is passed through an incinerator before it is delivered into the atmosphere through a stack, the invention permits a decrease of the emission of $SO_2$.

BRIEF DESCRIPTION OF DRAWINGS

The invention is illustrated diagrammatically and by way of example in the drawings and will now be described more in detail.

DESCRIPTION OF SPECIFIC EMBODIMENTS

Figure 1:
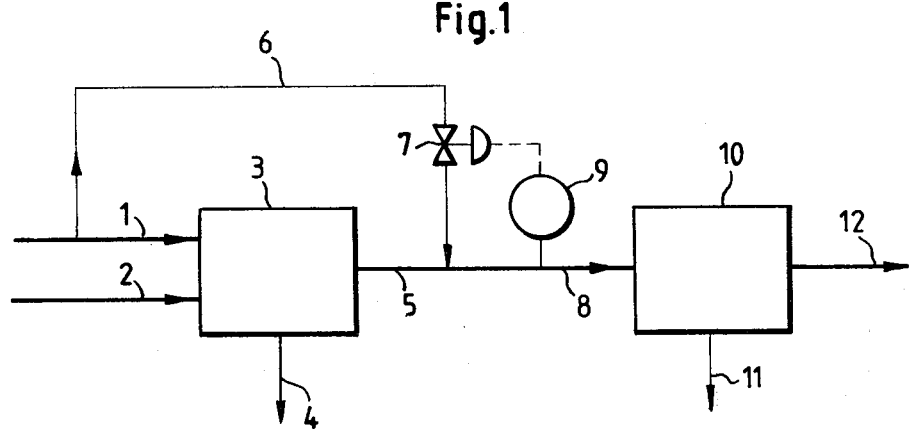
FIG. 1 illustrates the addition of an $H_2S$-containing gas at a controlled rate to the tail gas leaving the Claus plant.

In the drawings, 1 designates a duct for acid gases which contain $H_2S$ and are to be processed, 2 an air supply duct, 3 a Claus plant, 4 a withdrawal of sulfur, 5 a tail gas duct, 6 a branch stream diverted from acid gases which contain $H_2S$ and are to be processed (bypass), 7 a controller, 8 a duct leading to the tail gas-desulfurizing plant, 9 an analyzer, 10 the tail gas-desulfurizing plant, 11 the withdrawal of sulfur, 12 a duct leading to the incinerator and 13 (FIG. 2) the last contacting stage of a multistage Claus plant.

EXAMPLE 1

In accordance with FIG. 1, a gas which is saturated with water vapor and composed of
  86% by volume $H_2S$
  13% by volume $CO_2$ and
  1% by volume hydrocarbon
is reacted in a two-stage Claus plant 3 to sulfur in known manner. The sulfur yield amounts to 96%. On a long-time average and related on dry gas at 0° C. and 1.013 bars the tail gas from the Claus plant has in duct 5 the following sulfur contents:

| | | |
|---|---|---|
| $H_2S$ | 14.4 g S/m$^3$ | (0.66% by volume) |
| $SO_2$ | 7.2 g S/m$^3$ | (0.33% by volume) |
| COS + CS$_2$ | 0.5 g S/m$^3$ | |
| S$_{2-8}$ | 4.5 g S/m$^3$ | |
| Loss | 26.6 g S/m$^3$ | |

In accordance with the invention, a gas which contains $H_2S$ is added to the tail gas in 5 to maintain a stoichiometric ratio of 2:1 of $H_2S$ to $SO_2$ at the inlet of the tail gas-desulfurizing plant 10. The gas which contains $H_2S$ is diverted as a branch stream from the acid gas before the Claus plant and is caused to by-pass the Claus plant 3 in a duct 6 and added to the tail gas in duct 5. 0. to 2.6% of the acid gas are conducted as a branch stream through the by-pass. The Claus plant 3 is operated with a slight excess of air so that the ratio of $H_2S$ to $SO_2$ in the Claus plant 3 is equal to or lower than the stoichiometric ratio of 2:1. As a result of the addition of the branch stream of acid gas conducted through the by-pass 6, the ratio is quickly corrected and adjusted for a greater precision the desired stoichiometric ratio of 2:1 of $H_2S$ to $SO_2$.

As a result, the deviations from the stoichiometric ratio are limited so that the average excess of $H_2S$ or $SO_2$ in the gas from the Claus plant 3 is 1.1 g $S/m^3$.

All variations of the ratio of $H_2S$ to $SO_2$ in the gas in a range of 0.77 to 2.0 can be corrected by means of a branch stream of 0 to 2.6% of the acid gas which contains $H_2S$.

Because the stoichiometric ratio has been adjusted in the tail gas, the same can be desulfurized in the tail gas-desulfurizing plant to a residual content of 3.2 g $S/m^3$. The total yield of sulfur amounts to 99.5%. The contribution of the desulfurizing plant 10 for processing the tail gas in 8 in accordance with the invention to that sulfur yield amounts to 4.8%.

CONTROL EXAMPLE

A gas 1 having the same composition as in Example 1 is reacted to form sulfur in a Claus plant 3. The tail gas from the Claus plant has in 5 the same composition as the tail gas in Example 1.

But the ratio of $H_2S$ to $SO_2$ varies because the supply of combustion air cannot be corrected quickly enough. Owing to these variations, the total concentration of $H_2S$ and $SO_2$ is higher by 5.1 grams $S/m^3$, on a long-time average.

That tail gas is reacted to form sulfur in 10 by the Claus reaction as has been explained in Example 1.

The composition of the resulting exhaust gas in 12 varies too because $H_2S$ and $SO_2$ can react only in a ratio of 2:1 and any excess of $H_2S$ or of $SO_2$ will pass through the plant almost without a change.

Because the ratio of $H_2S$ to $SO_2$ varies, the exhaust gas in 12 contains an excess of $H_2S$ or of $SO_2$ so that the approximately following sulfur contents related to dry gas at 0° C. and 1.013 bars are obtained on a long-time average:

| | |
|---|---|
| $H_2S$ | 4.2 g $S/m^3$ |
| $SO_2$ | 2.1 g $S/m^3$ |
| $COS + CS_2$ | 0.5 g $S/m^3$ |
| $S_{2-8}$ | 0.1 g $S/m^3$ |
| Loss | 6.9 g $S/m^3$ |

This composition corresponds to a sulfur yield of 99.0%. As a result of the variations the conversion is lowered by 0.7% and the loss of sulfur is increased by 5.0 g $S/m^3$.

A comparison has been shown that the variation proceed through the tail gas-processing plant 10 virtually without a change. A small decrease by 0.1 grams $S/m^3$ is effected in the exhaust gas plant 10 by a backmixing of the gas and by the adsorption on the solid catalyst. As a result of the variations, the losses are increased to 1.0%, i.e., more than trebled.

In a processing according to the invention as explained in Example 1, the sulfur losses can be decreased to 0.5% so that the emission of sulfur is decreased by 50%.

EXAMPLE 2

Figure 2:
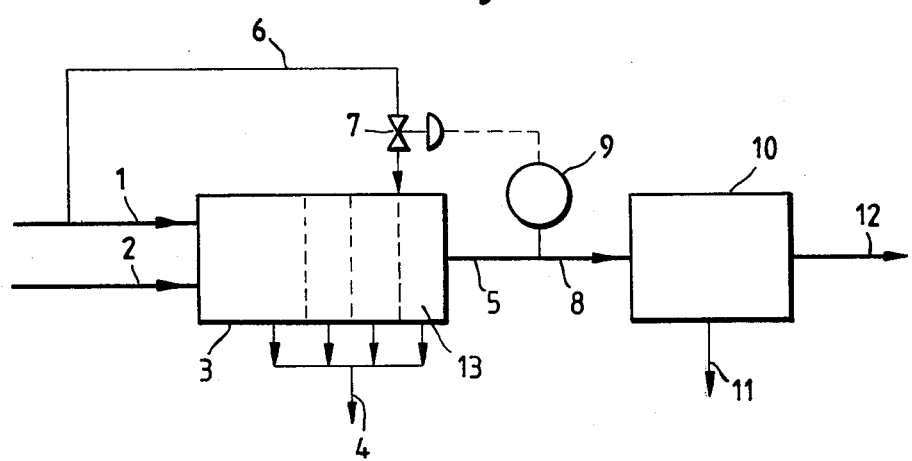
FIG. 2 illustrates the invention including the addition of an $H_2S$-containing gas at a controlled rate before the last contacting stage of a multistage Claus plant.

As a result of a processing of natural gas, an acid gas becomes available which is saturated with water vapor and contains 55% by volume $H_2S$, 43% by volume $CO_2$ and 2% by volume $CH_4$ and is processed in accordance with FIG. 2 in a Claus plant 3 and a succeeding tail gas-desulfurizing plant 10.

In accordance with the invention, a branch stream of 0 to 1.5% of the acid gas is diverted before the Claus plant 3 and caused to by-pass the Claus plant 3 in the duct 6. That branch stream is controlled by 7 and is fed to the three-stage Claus plant 3 before the last contacting stage 13. The rate of the $H_2S$-containing branch stream is so controlled that a stoichiometric ratio of 2:1 of $H_2S$ to $SO_2$ is maintained in the tail gas 5 from the Claus plant. A slight excess of air is fed in duct 2 to the burner of the Claus plant so that the Claus plant 3 is operated with a ratio of or below 2:1 of $H_2S$ to $SO_2$.

Because a branch stream of the acid gas is fed in accordance with the invention through the by-pass duct 6, any deviation from the stoichiometric ratio is quickly corrected and the desired ratio of $H_2S:SO_2=2$ is more closely approximated as any correction is detected in analyzer 9 with only a slight delay and the controller 7 for the branch stream can respond quickly.

Owing to these advantages afforded by the process according to the invention, the deviation from the stoichiometric ratio are limited so that the average surplus of $H_2S$ or $SO_2$ in the tail gas from the Claus plant 3 amounts in duct 8 to 0.5 g $S/m^3$. Related to dry gas at 0° C. and 1.013 bars, the tail gas in 8 has the following average sulfur contents:

| | |
|---|---|
| $H_2S$ | 6.6 g $S/m^3$ |
| $SO_2$ | 3.3 g $S/m^3$ |
| $COS + CS_2$ | 0.5 g $S/m^3$ |
| $S_{2-8}$ | 4.5 g $S/m^3$ |
| | 14.9 g $S/m^3$ | and the ratio of $H_2S$ to $SO_2$ varies in the range from 1.6 to 2.4. The exhaust gas in 8 is fed to a tail gas-processing plant 10, in which the $H_2S$ and $SO_2$ are catalytically reacted to form elementary sulfur, which is withdrawn at 11. The exhaust gas in 12 has a residual content of less than 2.5 g $S/m^3$. This corresponds to a sulfur yield in excess of 99.5%.

CONTROL EXAMPLE

In the control example, the rate and composition of the acid gas and the air rate are the same as in Example 2. The stoichiometric ratio of $H_2S$ to $SO_2$ is maintained in accordance with the prior art by a control of the air rate.

The yield of sulfur in the three-stage Claus plant 3 amounts to 97.5%. On a long-time average, the tail gas in duct 5 has the following sulfur contents, related to dry gas at 0° C. and 1.013 bars:

| | |
|---|---|
| $H_2S$ | 5.4 g $S/m^3$ = 0.26% by volume |
| $SO_2$ | 2.7 g $S/m^3$ = 0.13% by volume |
| $COS + CS_2$ | 0.4 g $S/m^3$ |
| $S_{1-8}$ | 4.5 g $S/m^3$ |

The ratio of $H_2S$ to $SO_2$ varies between 0.9 and 4.0 and the exact stoichiometric ratio of 2:1 is rarely obtained. During these variations there is an excess of $H_2S$ or of $SO_2$ and this excess amounts, on an average, to 2.1 g $S/m^3$ corresponding to about 0.1% by volume. The yield of the Claus plant 3 is reduced by 0.4% by the surplus of $H_2S$ or $SO_2$.

As $H_2S$ and $SO_2$ can react only at a ratio of 2:1, the excess of $H_2S$ or $SO_2$ will be found also in the desulfurized exhaust gas in 12. Whereas a sulfur yield of 99.6 (corresponding to a loss of 0.4%) could be achieved by stoichiometric processing, the variation of the ratio of $H_2S$ to $SO_2$ increases the average loss by 0.35% to 0.75%. One-third of the loss is due to that variation. The yield of sulfur amounts to 99.25% but the loss of sulfur and the emission of $SO_2$ are higher by 50% than in the process according to the invention.

The process of this invention can be employed for the treatment of acid gases having an $H_2S$ concentration of at least 10 volume percent. The process is especially useful in the treatment of acid gases containing between 40 and 100 volume percent $H_2S$. Other sulfur-containing compounds can be present in these gases. Where present they are generally present in an amount of up to about 10 volume percent, especially 0 to 0.2 volume percent. Where the $H_2S$ gas treated is one containing residual quantities of hydrocarbons, these hydrocarbons are generally present in an amount of 0 to 2 volume percent. Where the acid gases contain $CO_2$ it is generally present in an amount of between 0 and 50 volume percent.

Generally speaking, the gas treated in accordance with the invention have a high water concentration, yield by burning of $H_2S$. Often the feed acid gases are saturated with water vapor. Generally, the water content of the acid gases is between 5 and 10 volume percent.

The object of the process is, of course, to maintain a stoichiometric ratio of $H_2S:SO_2$ such that the mol ratio of $H_2S:SO_2$ is optimally 2:1. Within the invention, it is to be understood that by the use of an $H_2S$ or $SO_2$ containing gas fed to the tail gas from the Claus process, or to the components of the last stage of a multi-stage Claus process, the range of the ratio of $H_2S$ to $SO_2$ in the desulfurization plant can be less than $2\pm0.4:1$, while still providing the advantages. Preferably the mol ratio of $H_2S$ to $SO_2$ is exactly 2:1.

Generally speaking, the Claus process is carried out at a temperature of between 190° and 400° C., preferably 210° to 300° C. A pressure of between 1.0 and 1.5 bars is generally maintained.

The tail gas desulfurization plant is maintained at a temperature of between 100° and 200° C., preferably 120° to 160° C. The gas pressure in the exhaust gas desulfurization plant is between 1.0 and 1.2 bars.

Where a catalyst is employed in the tail gas desulfurization plant, the catalyst can be any one of the following: activated char coal, alumina or activated alumina.

What is claimed is:

1. A process for decreasing the sulfur content of an exhaust gas released after the recovery of sulfur from an acid gas containing $H_2S$ reacted with an oxygen-containing gas stream in a Claus plant which comprises withdrawing from said Claus plant a tail gas containing $H_2S$ and $SO_2$ at a molar ratio of up to 2:1, adjusting the molar ratio of $H_2S:SO_2$ to virtually exactly 2:1 in said tail gas by adding a gas containing $H_2S$ to form a stoichiometric gas mixture, analyzing said stoichiometric gas mixture to determine the concentration of $H_2S$ and $SO_2$ and, according to said analysis, adjusting the amount of said gas containing $H_2S$ to be added, the maximum amount of said gas containing $H_2S$ added being less than 5% of the acid gas fed into the Claus plant, catalytically reacting said stoichiometric gas mixture to form elementary sulfur and separately withdrawing said elementary sulfur and said residual gas, said gas containing $H_2S$ being added
   (i) either to the tail gas exiting from the Claus plant, or
   (ii) before the last contacting stage of a multi-stage Claus plant.

2. A process according to claim 1 wherein said gas containing $H_2S$ is diverted as a branch stream from the acid gas which is to be fed to the Claus plant and is to be processed therein.

3. A process according to claim 1, wherein the tail gases from two or more Claus plants are conducted to a common tail gas-processing plant and jointly desulfurized therein.

* * * * *